(12) United States Patent
Macey

(10) Patent No.: US 6,629,721 B1
(45) Date of Patent: Oct. 7, 2003

(54) MULTI-POSITIONAL SEATING SYSTEM FOR A MOTOR VEHICLE

(75) Inventor: Stuart P Macey, Carlsbad, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 13 days.

(21) Appl. No.: 10/138,166

(22) Filed: May 2, 2002

(51) Int. Cl.[7] .............................. A47C 9/06; B60N 2/36
(52) U.S. Cl. ..................... 297/15; 297/331; 297/334; 296/65.13; 296/65.15
(58) Field of Search ..................... 297/15, 331, 334; 296/65.13, 65.15

(56) References Cited

U.S. PATENT DOCUMENTS

| | | | | |
|---|---|---|---|---|
| 1,062,010 A | * | 5/1913 | Jacobson ..................... 297/15 |
| 4,925,229 A | * | 5/1990 | Siebler ..................... 297/331 X |
| 5,588,707 A | * | 12/1996 | Bolsworth et al. ...... 297/334 X |
| 6,099,072 A | * | 8/2000 | Sturt et al. ..................... 297/15 |
| 6,106,046 A | * | 8/2000 | Reichel ..................... 297/15 X |
| 6,199,951 B1 | * | 3/2001 | Zeile et al. ............... 297/15 X |
| 6,234,553 B1 | * | 5/2001 | Eschelbach et al. ...... 297/15 X |
| 6,279,982 B1 | * | 8/2001 | Nishimura et al. ....... 297/15 X |
| 6,375,255 B1 | * | 4/2002 | Maruta et al. ................ 297/15 |
| 6,382,491 B1 | * | 5/2002 | Hauser et al. ............ 297/15 X |
| 6,435,589 B2 | * | 8/2002 | Shimizu et al. ........... 297/15 X |
| 2001/0052718 A1 | * | 12/2001 | Sugiura et al. ............... 297/15 |
| 2002/0067056 A1 | * | 6/2002 | Garrido et al. ............... 297/15 |

FOREIGN PATENT DOCUMENTS

JP P 06219197 A * 8/1994 .................. 297/15

* cited by examiner

Primary Examiner—Rodney B. White
(74) Attorney, Agent, or Firm—Ralph E. Smith

(57) ABSTRACT

A seating system for a motor vehicle that provides one or more seats having independent tilting and height adjustments for an occupant's comfort or manipulation of the seat between a stowed and depolyed position. The seats have first and second support members adjustably linked to a third support member. The adjustable link between the first and third support members controls the tilt of the seat and the adjustable link between the second and third support member controls the height of the seat.

7 Claims, 5 Drawing Sheets

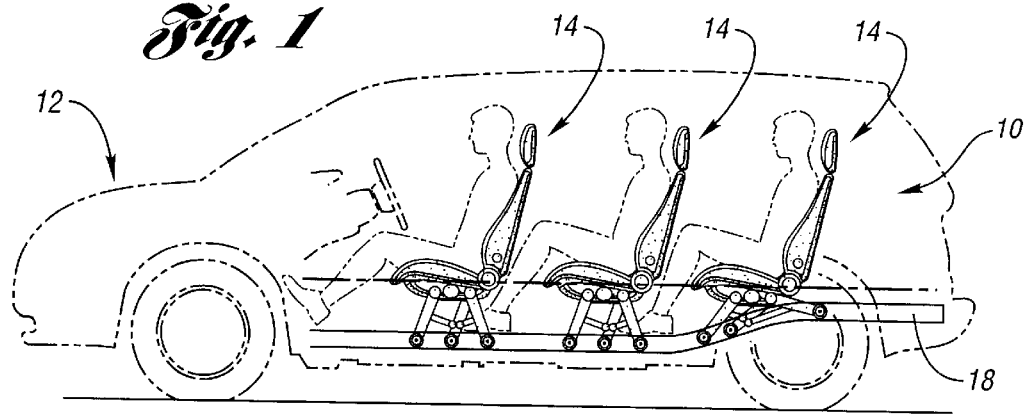
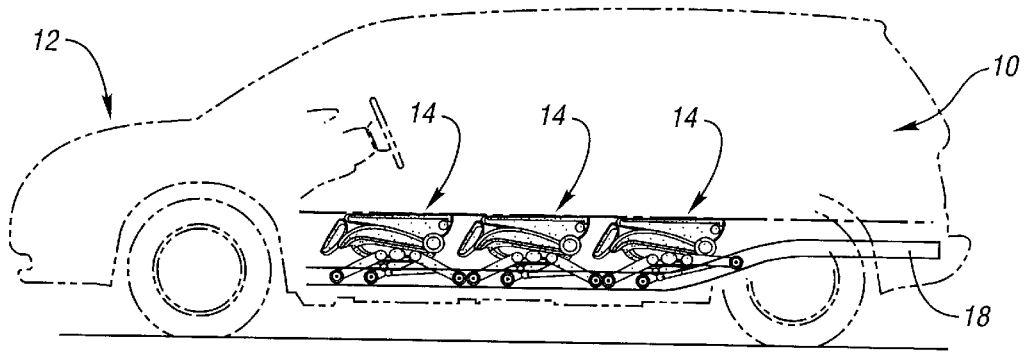
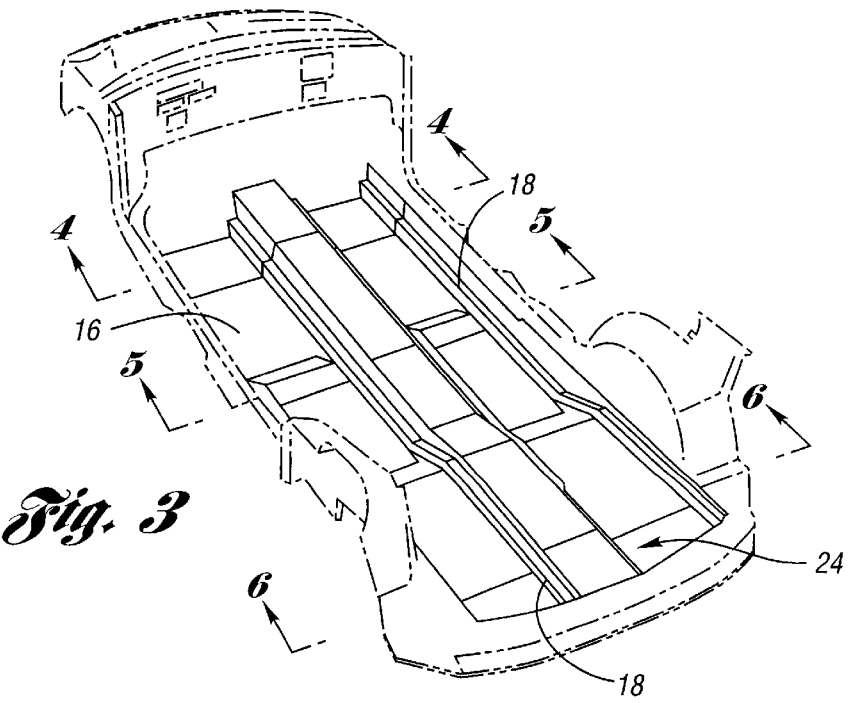

MULTI-POSITIONAL SEATING SYSTEM FOR A MOTOR VEHICLE

FIELD OF THE INVENTION

The present invention generally pertains to motor vehicles. More particular, the present invention pertains to a multi-positional seating system for a motor vehicle.

BACKGROUND OF THE INVENTION

Various seating arrangements for motor vehicles are well known in the art. For the comfort and convenience of the motor vehicle occupants conventional seating arrangements are adjustable in a fore-aft direction. Many seating arrangements are known in which the seating units are articulable between a stored position and a deployed position. In a deployed position, such seating arrangements function to significantly increasing the storage capacity of the motor vehicle.

One known seating arrangement is shown in commonly assigned U.S. Pat. No. 6,129,404. U.S. Pat. No. 6,129,404 discloses a passenger seat arrangement for a vehicle including a front seat assembly, a middle seat assembly, and a rear seat assembly. The middle seat assembly has two outer seat sections capable of moving independently of the center seat section for receiving passengers.

Another known seating arrangement is shown in commonly assigned U.S. Pat. No. 6,089,641. U.S. Pat. No. 6,089,641 discloses a tiered seating arrangement having, first, second and third seat assemblies. The second and third assemblies fold down to form a cargo carrying platform.

U.S. Pat. Nos. 6,129,404 and 6,089,641 are incorporated by reference as if fully set forth herein.

While known seating arrangements have proven to be acceptable for their intended purposes, a continuous need for improvement exists in the pertinent art.

SUMMARY OF THE INVENTION

It is a general object of the present invention to provide a multi-positional seating system with improved flexibility of seat positioning.

It is a related object of the present invention to provide a seating system that allows for independent adjustment of the height and attitude of a seat.

It is another object of the present invention to provide a multi-positional seating system that increases flexibility of seat stowage by providing a seat adapted to traverse along a track extending through the cabin of a vehicle. The flexibility of the seat stowage is further improved by providing independent seat adjustment into a stowed position through lowering of the height of the seat and manipulating the attitude.

In one particular form, the present invention provides a motor vehicle seating system having a vehicle floor and at least one seating unit. The at least one seating unit includes a seat having first, second and third support members each pivotally mounted to the seat at a first end and interconnected with the vehicle floor at a second end. A drive arrangement is provided for driving the seating unit between a deployed position and a stowed position. The drive arrangement is carried by the third support member and includes first and second rotatable drive shafts. First and second linkages interconnect the first and second rotatable drive shafts with the first and second support members, respectively. The first and second linkages operate to move the first and second support members relative to the third support member in response to rotation of the first and second rotatable drive shafts, respectively.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein:

FIG. 1 is a simplified side view of a motor vehicle incorporating a seating system according to the teachings of a preferred embodiment of the present invention, the seating units of the seating system each shown articulated to a deployed or operative position.

FIG. 2 is a simplified side view similar to FIG. 1, illustrating the seating units of the seating system of the present invention each articulated to a stored position.

FIG. 3 is a perspective view of a portion of the body of the motor vehicle of FIGS. 1 and 2.

IPTION OF THE PREFERRED EMBODIMENTS

Figure 4:
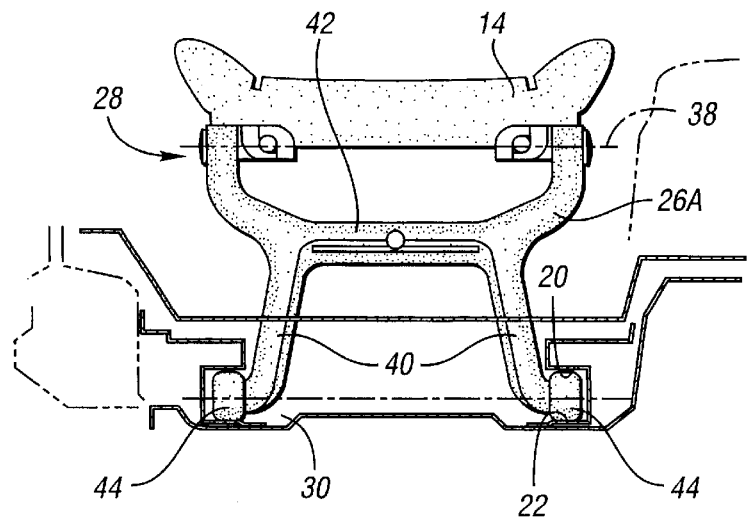
FIG. 4 is a cross-sectional view taken along the line 4—4 of FIG. 3, further illustrating the pertinent portion of the body of the motor vehicle operatively associated with a first support member of a seating unit.
Figure 5:
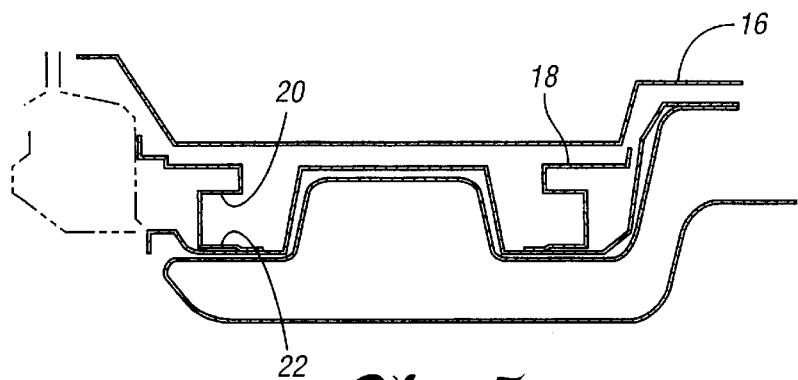
FIG. 5 is a cross-sectional view taken along the line for 5—5 of FIG. 3, further illustrating the pertinent portion of the body of the motor vehicle in operative association with a seating unit.
Figure 6:
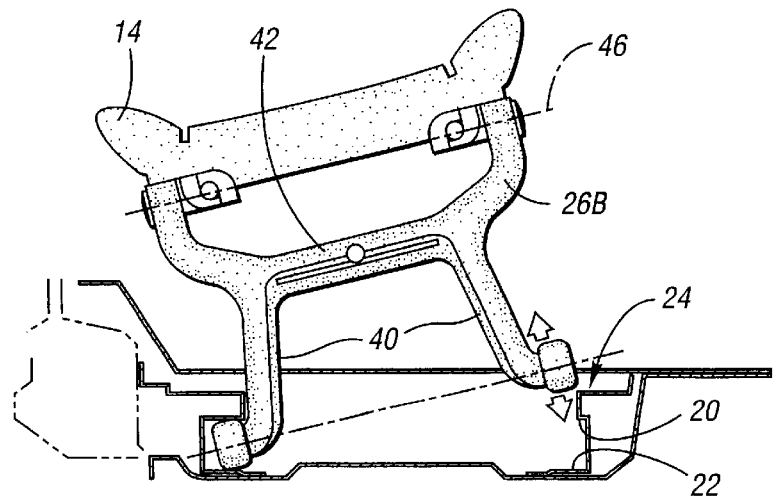
FIG. 6 is a cross-sectional view taken along the line for 6—6 of FIG. 3, and further illustrating the pertinent portion of the body of the motor vehicle operatively associated with a second support member of a seating unit.

The following description of the preferred embodiment(s) is merely exemplary in nature and is in no way intended to limit the invention, its application, or uses.

With initial reference to FIGS. 1 and 2, a seating system constructed in accordance with the teachings of a preferred embodiment of the present invention is illustrated and generally identified at reference element 10. The seating system 10 is shown incorporated into a motor vehicle 12. The particular motor vehicle 12 illustrated is a mini-van. However, those skilled in the art will appreciate after reading the remainder of this detailed description that the teachings of the present invention are applicable to various other applications and are in no way limited to the exemplary arrangement shown in the drawings.

The seating system 10 of the present invention is illustrated to generally include a plurality of seating units or seats 14 and a floor 16. In the exemplary embodiment illustrated, the seating system 10 includes six seats 14. In the side views of FIGS. 1 and 2, three of the seats 14 are depicted. However, it will be understood that the seats 14 are arranged in pairs so as to define a front row, a center row and a rear row. Further in the exemplary embodiment, the seats are illustrated as bucket seats 14. Those skilled in the art will appreciate that the subject invention may alternatively incorporate a greater or lesser number of seats 14 within the scope of the present invention. Furthermore, it will be understood that the teachings or the present invention are also applicable for bench seats.

With continued reference to FIGS. 1 and 2 and additional reference to FIGS. 3–11, the construction and operation of the seating system 10 of the present invention will be described in further detail. In the embodiment shown, the seats 14 are substantially identical. For this reason, a complete understanding of the subject invention may be had through the description of one of the seats 14. With particular reference to FIGS. 3–6, it will become apparent that the vehicle floor 16 is adapted for selective fore and aft adjustment of the seats 14 with respect to the motor vehicle 12.

In a preferred configuration, the vehicle floor 16 defines a track 18 extending from a front portion of the vehicle cabin to a rear portion. In one application, the track is defined by a metal stamping that is welded or otherwise permanently secured to the vehicle floor 16. The track 18 has an upper support or portion 20 in the form of an inwardly extending flange for retaining a seat support member within the track 18 and a lower support or portion 22 or surface for supporting the seat 14 along the length of the track 18. In the exemplary embodiment, the number of adjustments of the seats 14 relative to the floor 16 along the track 18 is infinite. However, other configurations are possible, such as indexing, stops, and the like.

The track 18 is further configured with at least one opening 24 for the installation and removal of the vehicle seats 14 into and from the floor 16. The opening 24 is defined by a reduced portion of the upper support 20 such that the seating units 14 of the seating system 10 can be removed as particularly illustrated in FIG. 6. While the opening 24 is located in the rear of the vehicle, it is foreseeable that the one or more openings 24 can be created at various locations along the length of the track 18. In such a manner, the seats 14 of the center row of seats could be removed first, for example.

Referring particularly to FIGS. 4 and 7a–d, the seats 14 are illustrated to include a seat bottom, a seat back and a plurality of support members 26. The support members of the plurality of support members 26 function to pivotally mount the seat 14 at a first end 28 and interconnect to the track 18 at a second end 30. In a preferred embodiment the plurality of support members 26 includes a first support member 26A, a second support member 26B and a third support member 26C. As will become apparent below, the configuration of the support members 26 allows for an adjustment of the height of the seat 14 through the relationship between the second and third support members 26B and 26C and allows for a tilting action of the seat 14 though the relationship between the first and third support members 26A and 26C.

Referring particularly to FIGS. 4, 7a–d, 8 and 9, the first support member 26A of the seats 14 of the present invention is illustrated connecting the seat bottom of the seat 14 to the track 18. Preferably, the first support member 26A includes two legs 40 joined by an intermediate portion 42 in which a first end 28 is coupled to the seat 14 and the second end 30 is interconnected to the track 18. The first support member 26A is mounted to the seat 14 on a first pivot axis 38 using two pivotal connectors, such as pivot pins (not shown). Likewise, the interconnection of the first support member 26A to the track 18 is also through two connector members wherein a portion of the two connector members are housed between the upper and lower portions 20 and 22 of the track 18. Preferably, the connector members are rollable members, such as wheels 44. However, any slidable or other low friction members may also be used.

The second support member 26B of the present invention is illustrated connecting another portion of the seat 14 to the track 18. Preferably, the second support member 26B includes two legs 40 joined by an intermediate portion 42 in which a first end 28 is coupled to the seat 14 and the second end 30 is interconnected to the track 18. As with the first support member 26A, the second support member 26B is mounted to the seat 14, but instead, on a second pivot axis 46 using two pivotal connectors (not shown). The interconnection of the second support member 26B to the track 18 is also through two connector members wherein a portion of the two connector members are housed between the upper and lower portions 20 and 22 of the track 18. As above, the connector members preferably are rollable members, such as wheels 44. However, any slidable or other low friction members may also be used.

The third support member 26C of the present invention is illustrated connecting a portion of the seat 14 to the track 18. Preferably, the third support member 26C includes two legs 40 joined by an intermediate portion 42 in which a first end 28 is coupled to the seat 14 and the second end 30 is interconnected to the track 18. As with the second support member 26B, the third support member 26C is mounted to the seat 14 on the second pivot axis 46 using two pivotal connectors (not shown). The interconnection of the third support member 26C to the track 18 is also through two connector members wherein a portion of the two connector members are housed between the upper and lower portions 20 and 22 of the track 18. Again, the connector members preferably are rollable members, such as wheels 44, but may alternatively be any slidable or other low friction members.

Figure 7A:
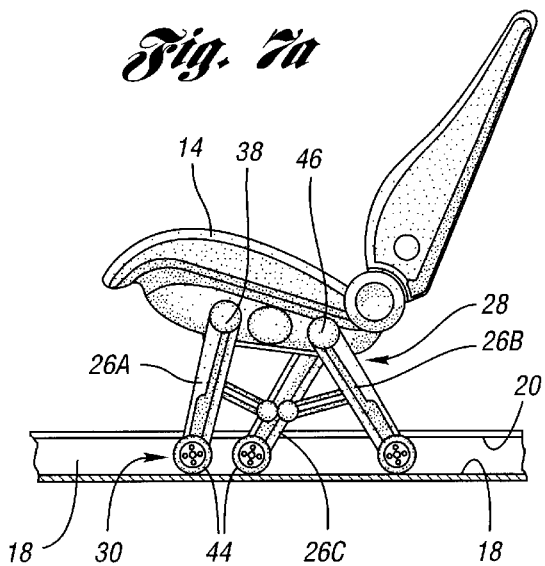
FIGS. 7a–d represent a series of views illustrating various positions of one of the seating units of the seating of the present invention.
Figure 7B:
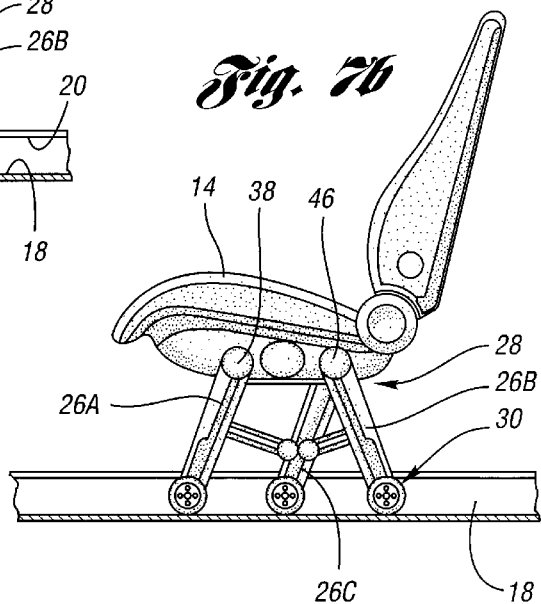
Figure 7C:
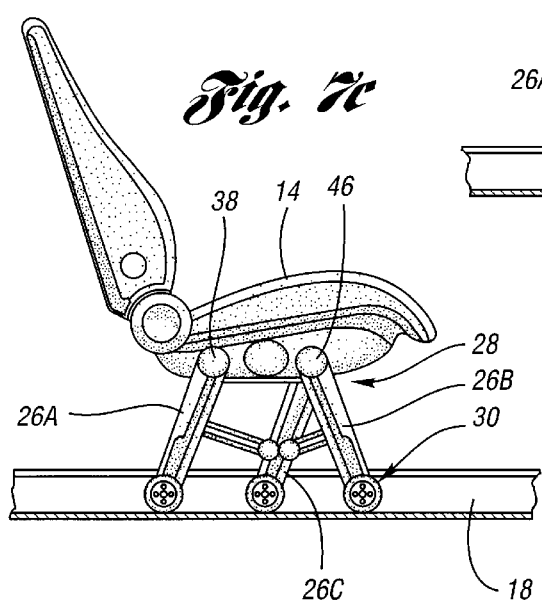
Figure 7D:
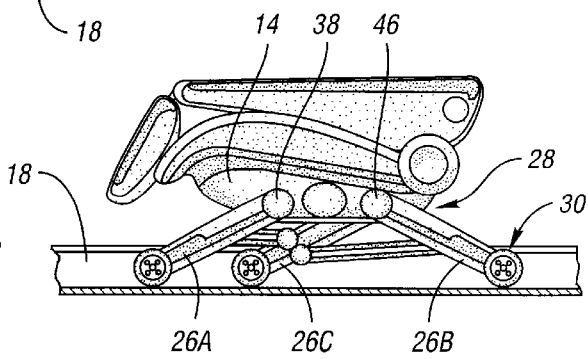

The third support member 26C further includes a drive arrangement 48 for manipulating the seating unit between various deployed positions (FIGS. 7a–c) and a stowed position (FIG. 7d). The drive arrangement 48 includes a first drive shaft 50 and a second drive shaft 52 in the intermediate portion 42 of the third support member 26C. The first and second rotatable drive shafts 50 and 52 have a shaft axis which is perpendicular to the length of the track and substantially parallel to the vehicle floor 16. The first and second drive shafts 50 and 52 include a first thread portion 54, a second thread portion 56 and a center portion 66. The first and second thread portions 54 and 56 are manufactured in opposite directions such that an axial force is created along the shaft by the threads of the first and second thread portions 54 and 56. The force created results in the outward or inward drive of an attached member in which the force created is depends on the rotation of the first and second drive shafts 50 and 52.

Figure 8:
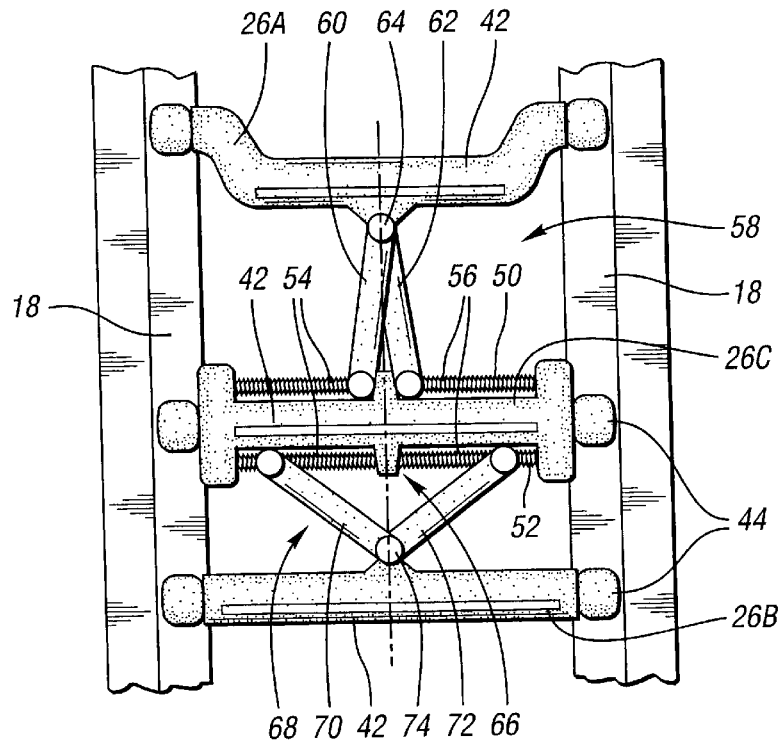
FIG. 8 is a plan view of a drive mechanism of one of the seating units of the seating system of the present shown with the seating unit in its stored position.
Figure 9:
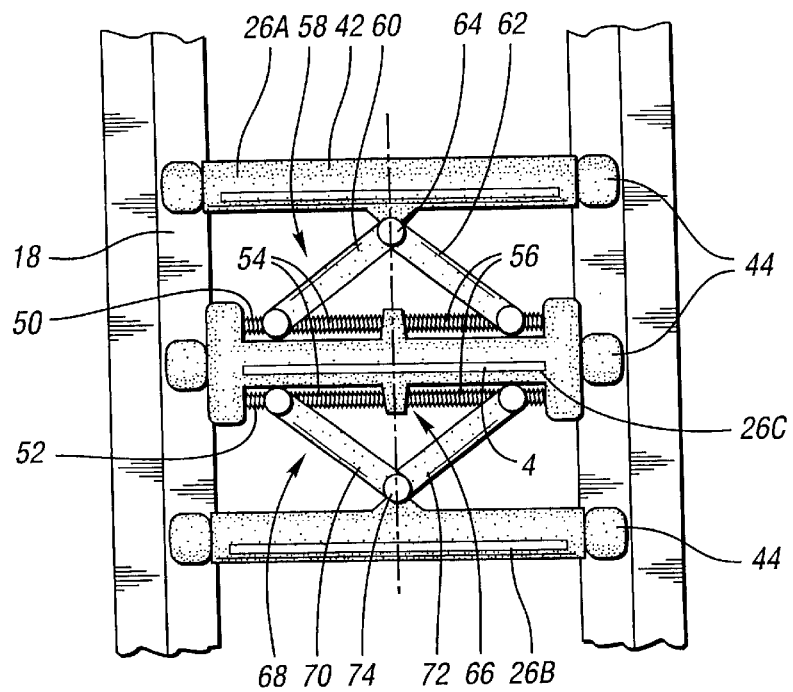
FIG. 9 is a plan view similar to FIG. 8, illustrating the drive mechanism of the seating unit when the seating unit is in its deployed position.

Referring particularly to FIGS. 8 and 9, a first linkage 58 is provided for linking the first support member 26A with the third support member 26C, which provides a mechanism for tilting the seat 14 forward or rearward. The first linkage 58 is operative to move the first support member 26A relative to the third support member 26C in response to rotation of the first drive shaft 50. The first linkage 58 includes a first arm 60 and a second arm 62 coupled to the first support member 26A at a first intermediate pivot axis 64 at a first end. The second end of the first and second arms 60 and 62 are threadably engaged with one of the first or second screw portions 54 and 56 of the first drive shaft 50. Rotation of the first drive shaft 50 drives the first and second arms 60 and 62 towards or away from the center portion 66 of the first drive shaft 50, which in turn moves the first support member 26A away from or toward the third support member 26C, thereby resulting in the tilting of seat 14.

A second linkage 68 is provided for linking the second support member 26B with the third support member 26C, which provides a mechanism for raising and lowering the seat 14. The second linkage 68 includes a first and second arm 70, 72 coupled to the second support member at a second intermediate pivot axis 74 at a first end. The second end of the first and second arms 70 and 72 are threadably engaged with one of the first and second screw portion 54 and 56 of the second drive shaft 52. Rotation of the second drive shaft 52 drives the first and second arms 70 and 72 toward or away from the center portion 66 of the second drive shaft 52 which move the second support member 26C away from or toward the third support member 26C, thereby resulting in a change of height of seat 14.

A drive mechanism (not specifically shown) is provided for rotating the first and second drive shafts 50 and 52. Activation of the drive mechanism is preferably accomplished through one or more switches, buttons or the like located proximate to the occupant of the seat 14. The activation controls may consist of a first activation unit 78 for controlling the rotation of the first drive shaft 50 and a second activation unit 80 for controlling the rotation of the second drive shaft 52. Other configurations are foreseeable for selectively controlling the rotation of the first and second drive shaft.

The following examples demonstrate the operations available with the present invention. Referring to FIGS. 7b and 8–10, a first operation is illustrated wherein the seat 14 is tilted forward. The first activation unit 78 is provided for selecting the forward rotation of the seat 14 with respect to the seat orientation. The first activation unit 78 communicates with the drive mechanism to rotate the first drive shaft 50, which is dependant upon the direction of the threads on the first and second screw portions 54 and 56 of the first drive shaft 50. Rotation of the first drive shaft 50 drives the second end of the arms 60 and 62 toward the center portion 66 of the first drive shaft 50 which in turn increases the distance between the first support member 26A and the third support member 26C. This action decreases the height of the front portion of the seat 14 with respect to the floor, thereby resulting in the seat 14 tilting forward with respect to the second pivot axis 46. During this operation, the overall height of the seat 14 remains substantially the same as. a result of the distance between the second and third support members 26B and 26C remaining unchanged.

In contrast, by reversing the direction of the drive mechanism, rotation of the first drive shaft 50 drives the second end of the arms 60 and 62 away from the center portion 66 of the first drive shaft 50 which decreases the distance between the first support member 26A and the third support member 26C. This action increases the height of the front portion of the seat 14 relative to the vehicle floor 16, thereby resulting in tilting of the seat 14 rearward about the second pivot axis 46. Again, the overall height of the seat 14 remains substantially the same as a result of the rear support members 26B and 26C remaining unchanged.

Referring particularly to FIGS. 7d, 8–10, a second operation is illustrated wherein the height of the seat 14 is changed. The second activation unit 80 is provided for raising and lowering the seat. The second activation unit 80 communicates with the drive mechanism 70 to rotate the second drive shaft 52. Rotation of the second drive shaft 52 drives second end of the arms 60 and 62 towards the center portion of the second drive shaft 52 which in turn decreases the distance between the second support member 26B and the third support member 26C, thereby resulting in lowering of the seat 14. There is no tilting affect due to the distance between the first and third support member 26A and 26C remaining substantially unchanged.

In contrast, by reversing the direction of the drive mechanism, the arms 60 and 62 are driven outward, thereby decreasing the distance between the second and third support members 26B and 26C. This action results in the second and third support members 26B and 26C pivoting toward each other, thereby causing the rear portion of the seat 14 to raise. Again, there is no tilting of the seat 14 due to the distance between the first and the third support member 26A and 26C remaining substantially unchanged.

Figure 10:
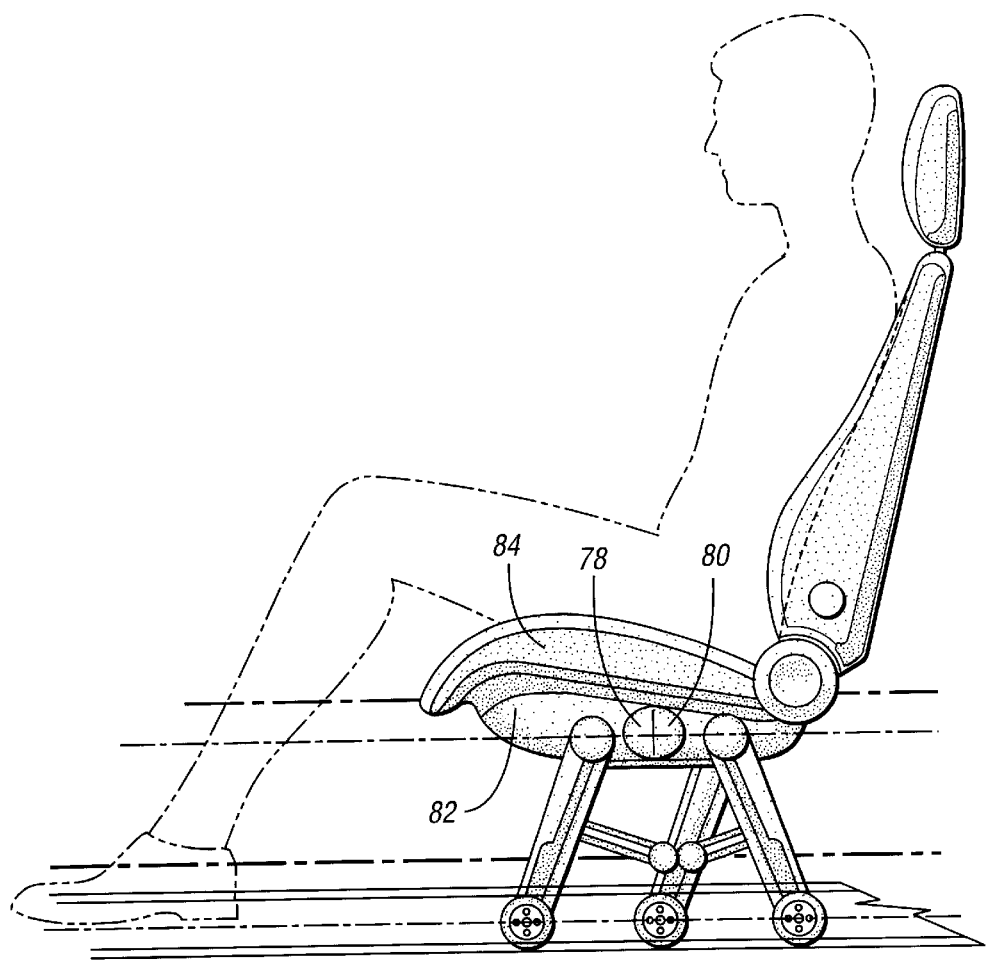
FIG. 10 is a plan view of one of the seating units of the seating of the present invention.
Figure 11:
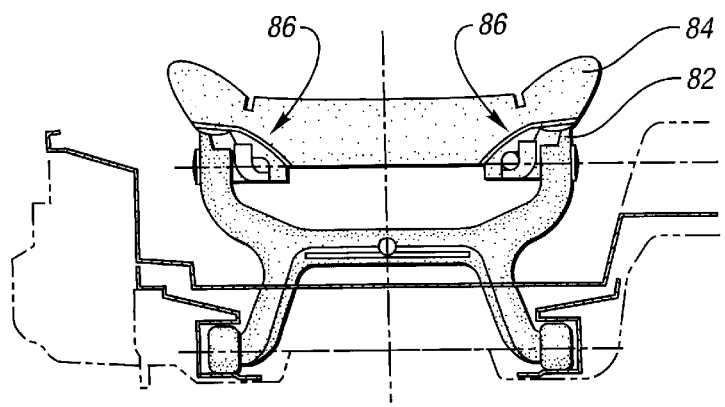
FIG. 11 is a cross-sectional view of the seating unit of illustrated in FIG. 10.

Referring particularly to FIGS. 10 and 11, in addition to the above mentioned examples of operation, the seat 14 may include of two portions 82 and 84. The first portion 82 houses the pivots for the support members 26A, 26B and 26C. The second portion 84 is mounted to the first portion 82 through a pair of camming members which allow the second portion 84 to pivot with respect to the first portion 82. Other configurations are available for adjusting the second portion 84 of the seat in addition to the adjustments of the present invention.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seating unit in combination with a motor vehicle having a vehicle floor, the seating unit comprising:

a seat;

a first support member pivotally mounted to the seat at a first end and interconnected with the vehicle floor at a second end;

a second support member pivotally mounted to the seat at a first end and interconnected with the vehicle floor at a second end;

a third support member pivotally mounted to the seat at a first end and interconnected with the vehicle floor at a second end;

a drive arrangement for driving the seating unit between a deployed position and a stowed position, the drive arrangement carried by the third support member and including first and second rotatable drive shafts; and first and second linkages interconnecting the first and second rotatable drive shafts with the first and second support members, respectively, the first and second linkages operative to move the first and second support members relative to the third support member in response to rotation of the first and second rotatable drive shafts, respectively.

2. The seating unit of claim 1, wherein each of the first and second linkages includes first and second arms coupled to the associated one of the first and second support members at a common pivot axis, opposing ends of the first and second linkages threadably engaging the associated one of the first and second rotatable drive shafts.

3. The seating unit of claim 2, wherein the first and second rotatable drive shafts have first and second thread portions threaded in opposite directions, the first and second thread portions threadably engaged with the first arm and the second arm, respectively.

4. The seating unit of claim 1, wherein the at least one seating unit further comprises an activation unit for selectively rotating the first rotatable drive shaft and the second rotatable drive shaft.

5. The seating unit of claim 1, wherein the first support member pivots on a first axis and the second and third support members pivots on a second common axis.

6. The seating unit of claim 1, wherein the vehicle floor defines a track having an upper support and a lower support receiving the first, second and third support members.

7. The seating unit of claim 6, wherein the first, second, and third support members are interconnected with the track through wheels pivotly mounted to the first, second and third support members and rollably housed between the upper and lower supports of the track.

* * * * *